United States Patent
Polehn et al.

(10) Patent No.: US 11,212,344 B1
(45) Date of Patent: Dec. 28, 2021

(54) SYSTEMS AND METHODS FOR UTILITIES-BASED WORKLOAD MANAGEMENT IN A COMMUNICATION NETWORK

(71) Applicant: Verizon Patent and Licensing Inc., Basking Ridge, NJ (US)

(72) Inventors: Donna L. Polehn, Mercer Island, WA (US); Patricia R. Chang, San Ramon, CA (US); Jin Yang, Orinda, CA (US); Arda Aksu, Lafayette, CA (US); Lalit R. Kotecha, San Ramon, CA (US); Vishwanath Ramamurthi, San Ramon, CA (US); David Chiang, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/008,139

(22) Filed: Aug. 31, 2020

(51) Int. Cl.
*G06F 15/173* (2006.01)
*H04L 29/08* (2006.01)

(52) U.S. Cl.
CPC ...... *H04L 67/1008* (2013.01); *H04L 67/1023* (2013.01)

(58) Field of Classification Search
CPC .................. H04L 67/1008; H04L 67/1023
USPC ........................................... 709/226
See application file for complete search history.

(56) References Cited

U.S. PATENT DOCUMENTS

| | | | |
|---|---|---|---|
| 8,527,996 B2* | 9/2013 | Murthy | G06F 9/4881 718/102 |
| 8,635,325 B2* | 1/2014 | Konopka | H04L 43/00 709/223 |
| 8,799,858 B2* | 8/2014 | Martinez Canedo | G06F 8/20 717/121 |
| 10,440,096 B2* | 10/2019 | Sabella | H04L 47/803 |
| 10,491,303 B2* | 11/2019 | Ashrafi | H04L 27/00 |
| 10,606,642 B1* | 3/2020 | Franklin | G06F 1/206 |
| 10,757,757 B2* | 8/2020 | Sabella | H04W 12/009 |
| 10,903,906 B2* | 1/2021 | Ashrafi | H04B 10/11 |
| 2017/0070567 A1* | 3/2017 | Lee | H04L 67/1023 |
| 2019/0138934 A1* | 5/2019 | Prakash | G06K 9/00993 |
| 2019/0158606 A1* | 5/2019 | Guim Bernat | H04W 4/40 |
| 2019/0220703 A1* | 7/2019 | Prakash | G06N 20/00 |
| 2020/0296187 A1* | 9/2020 | Sabella | H04W 4/40 |
| 2021/0019194 A1* | 1/2021 | Bahl | G06N 20/00 |
| 2021/0042140 A1* | 2/2021 | Paul | G06F 1/324 |
| 2021/0067605 A1* | 3/2021 | Roth | H04L 67/10 |

* cited by examiner

*Primary Examiner* — Alicia Baturay

(57) ABSTRACT

An illustrative workload management system obtains resource utilization data representing utilization of network equipment of a communication network, obtains utilities data representing information about utilities at network facilities at which the network equipment is deployed, and assigns, based on the resource utilization data and the utilities data, a workload among the network equipment deployed at the network facilities. Corresponding methods and systems are also described.

20 Claims, 8 Drawing Sheets

SYSTEMS AND METHODS FOR UTILITIES-BASED WORKLOAD MANAGEMENT IN A COMMUNICATION NETWORK

BACKGROUND INFORMATION

Network equipment of a modern communication network is typically deployed at distributed geographic locations called network sites. At a network site, a network facility (e.g., a structure such as a building) houses network equipment (e.g., computing devices implementing network servers, routers, gateways, etc.) and provides utilities such as physical space, electrical power, and cooling that support deployment and operation of the network equipment at the network site. The finite nature of the utilities available at network facilities may limit the deployment and operation of network equipment, particularly for network equipment that consumes large amounts of power, generates significant heat, and/or requires a large physical space.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
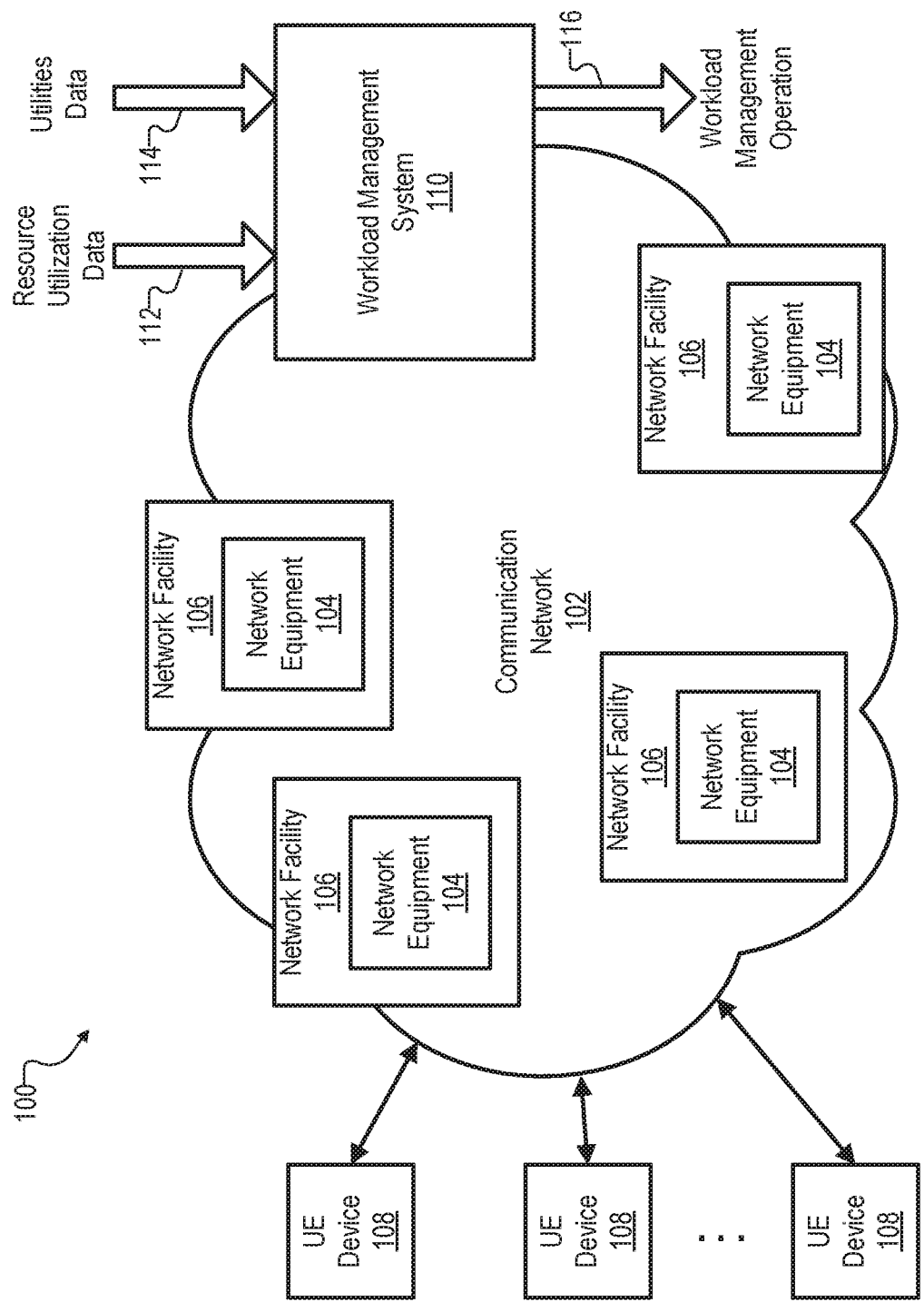
FIG. 1 shows an illustrative configuration of a communication network in which a workload management system is implemented according to embodiments described herein.

Systems and methods for utilities-based workload management in a communication network are described herein. The systems and methods may manage the workload of network equipment of a communication network by identifying and performing workload management operations based at least in part on utilities data representing information about utilities at network facilities at which the network equipment is deployed. The utilities data may be used in combination with additional data, such as resource utilization data representing utilization of the network equipment, to identify and perform workload management operations in the communication network. For example, a workload management system may implement an intelligent algorithm for orchestrating assignment of workload tasks among the network equipment of the communication network based on various inputs to the algorithm. The inputs may include information about utilities at network facilities, and the intelligent algorithm may be configured to factor, in any suitable way, the information about utilities at network facilities into orchestrating assignment of workload tasks. Illustrative examples of a workload management system managing the workload of network equipment of a communication network based at least in part on utilities data representing information about utilities at network facilities at which the network equipment is deployed are described herein.

By managing the workload of network equipment of a communication network based at least in part on information about utilities at network facilities at which the network equipment is deployed, a workload management system may facilitate optimized operation of the communication network. For example, based on information about utilities at network facilities, the workload management system may direct workload tasks to network equipment at network facilities that have available utilities such as electrical power, air temperature, and/or cooling capacity to accommodate the workload tasks and/or may direct workload tasks away from network equipment at network facilities that lack or have relatively less available utilities to accommodate the workload tasks. This may facilitate distribution of workload among network equipment in a manner that considers the utilization of utilities at network facilities at which the network equipment is deployed, which may facilitate optimized (e.g., load balanced) utilization of one or more utilities at the network facilities.

To illustrate an example, certain network equipment such as multi-access edge compute (MEC) servers require significant power and generate significant heat at a network facility. A workload management system may obtain utilities data for the network facility and manage the workload of the MEC servers at the network facility based at least in part on the utilities data, such as by identifying and performing one or more workload management operations to direct workload tasks to and/or from the MEC servers at the network facility based at least in part on information about utilities at the network facility. The workload management operations may facilitate operation of MEC servers at the network facility in a manner that optimizes utilization of utilities at the network facility while also providing expected operational performance (e.g., by continuing to satisfy latency requirements). For example, when a utilization of a utility (e.g., power, temperature, etc.) at the MEC server network facility reaches a defined threshold utilization, the workload management system may direct certain workload tasks, such as certain latency-tolerant workload tasks away from the MEC servers at the MEC server network facility and to other network equipment at one or more other network facilities, such as to a multi-access cloud server and/or to other MEC servers deployed at other network facilities, to conserve the utility at the MEC server network facility while still meeting latency requirements for the latency-tolerant workload tasks.

Systems and methods described herein may provide additional or alternative features and benefits as may serve a particular implementation. Various embodiments will now be described with reference to the figures. The disclosed embodiments may provide one or more of the features and benefits mentioned above and/or various additional and/or alternative features and benefits that will be made apparent herein.

FIG. 1 shows an illustrative configuration 100 of a communication network 102 that includes network equipment 104 deployed at distinct network facilities 106 distributed throughout communication network 102. User equipment (UE) devices 108 and certain network equipment 104 may be communicatively coupled to one another such that UE devices 108 may request and receive one or more services by way of communication network 102 (e.g., from network equipment 104). Network equipment 104 may be configured to provide certain services to UE devices 108. Illustrative services may include, without limitation, network connectivity services, data communication services, and/or any services that use network connectivity and/or data communication. Examples of such services include, but are not limited to, data streaming services, mobile application services, software-as-a-service services, platform-as-a-service services, infrastructure-as-a-service services, multi-access server services (e.g., cloud computing services and/or multi-access edge computing (MEC) services), communication services, and digital content delivery services.

Each UE device 108 may be implemented as any computing device configured to connect to communication network 102 and to request and/or receive services by way of communication network 102, such as services provided by network equipment 104 by way of communication network 302. UE devices 108 may be associated with one or more users. For example, a UE device 108 implemented as a personal computer (e.g., a desktop or laptop computer, etc.) or a mobile device (e.g., a smartphone or tablet device, etc.) may be controlled by a user of the UE device 108. Other types of UE devices (e.g., certain Internet-of-Things (IoT) devices and embedded systems such as may be employed in smart appliances, specialized testing or automation equipment, etc.) may not be associated with a specific user, or may be one of multiple UE devices 108 controlled by a single user.

Each instance of network equipment 104 deployed at a network facility 106 may include or be implemented by a computing system (e.g., a server, a blade server, an edge server, a set of servers at a single site, etc.) that includes a set of computing resources (e.g., memory, processing, throughput, latency, and/or other computing resources). The computing resources may include and/or may be provided using a combination of hardware and software resources.

Network equipment 104 may represent various types of network equipment deployed throughout communication network 102. For example, network equipment 104 may include routers, gateways, hubs (e.g., CRAN and/or DRAN hubs), radio transceivers, antennas, radio access network (RAN) equipment, servers, and/or any other types of network equipment. In certain examples, certain network equipment 104 includes multi-access servers that are each accessible to multiple UE devices 108 and configured to perform processing and data services for the UE devices 108. Such multi-access servers may include multi-access edge compute (MEC) servers implemented within a provider network of communication network 102 (e.g., so as to be near the edge of communication network 102 where UE devices 108 connect to the network) and/or other multi-access servers (e.g., cloud servers) implemented farther from the edge of the provider network (e.g., within external networks that are accessible to UE devices 108 by way of the provider network).

Network equipment 104 is configured to perform operations to handle workload assigned to network equipment 104. The workload of network equipment 104 may include one or more workload tasks that are performed, are being performed, and/or are to be performed by network equipment 104 of communication network 102. A workload task may include any process(es), function(s), operation(s), or the like that may be performed by and/or may otherwise utilize resources (e.g., processors, memory, and/or other computing resources) of network equipment 104. For example, a workload task may include one or more processing operations that may be executed by a processor of network equipment 104.

The workload of network equipment 104 may be associated with services requested by and provided to UE devices 108. For example, a UE device 108 may provide a request for a service. The requested service may be associated with a workload, which may include a set of workload tasks to be performed to provide the requested service to the UE device 108. Network equipment 104 may be configured to receive the request and/or perform the set of workload tasks associated with the request to provide the requested service to the UE device 108. Specific instances of network equipment 104 may be assigned to handle specific workloads (e.g., specific workload tasks) in any of the ways described herein.

Communication network 102 may represent various networks or parts of networks used to enable communication between UE devices 108 and network equipment 104. To this end, communication network 102 may implement or employ any suitable communication technologies, devices, media, protocols, or the like as may serve a particular implementation. In some examples, communication network 102 may include a provider network and/or additional networks outside of the provider network (e.g., external networks associated with the Internet).

A provider network included within communication network 102 may be implemented as a provider-specific wired or wireless communications network (e.g., a cellular network used for mobile phone and data communications, a 5G network or a network of another suitable technology generation, a cable or satellite carrier network, a mobile telephone network, a traditional telephone network, etc.), and may be operated and managed by a provider entity such as a mobile network operator (e.g., a wireless service provider, a wireless carrier, a cellular company, etc.). The provider of the provider network may own or control all of the elements necessary to deliver communication services to UE devices 108, including radio spectrum allocation, wireless network infrastructure, back haul infrastructure, customer care, provisioning of devices, and so forth.

In various examples, a provider network included within communication network 102 may include or consist of various network resources that may be associated with network equipment 104 such as MEC servers. For instance, one or more radio access network (RAN) resources may directly communicate with UE devices 108 and may provide access to MEC servers integrated with and/or communicatively coupled to the RAN resources, one or more transport access point (TAP) resources may communicate with UE devices 108 indirectly (e.g., by way of the RAN resources) and may provide access to additional integrated MEC servers, one or more service access point (SAP) resources may communicate with UE devices 108 indirectly (e.g., by way of the RAN and/or TAP resources) and may provide access to still other integrated MEC servers, and so forth. In all of these examples, the MEC servers integrated within the network resources may implement certain network equipment 104 shown in configuration 100. Additionally, in some examples, other network resources may likewise assist in providing communication services for UE devices 108 and/or may provide access to MEC servers or other network equipment 104 in any manner as may serve a particular implementation.

Along with a provider network such as has been described, communication network 102 may further include elements of one or more additional networks external to the provider network (e.g., third-party networks associated with the Internet, etc.). Access to additional network equipment 104 (e.g., cloud servers, etc.) beyond the MEC servers of the provider network may be provided by these additional networks. Certain additional network elements within communication network 102 may be included within peer networks connected to the provider network by high bandwidth connections (e.g., direct fiber optic lines, etc.), such that certain network equipment 104 may be operated on the peer networks. Other network elements of communication network 102 may be associated with networks external to the provider network, such that other network equipment 104 may be implemented by cloud servers operated by cloud computing enterprises such as VERIZON (e.g., VERIZON Cloud), AMAZON (e.g., AMAZON Web Services (AWS)), MICROSOFT (e.g., MICROSOFT Azure), GOOGLE (e.g., GOOGLE Cloud Platform (GCP)), ORACLE (ORACLE Cloud), or the like.

As mentioned, network equipment 104 is deployed at distinct network facilities 106 distributed throughout communication network 102. Network facilities 106 are located at network sites at different geographic locations. The different geographic locations may be any locations suitable for deployment of network equipment 104 to support operation of communication network 102. Network facilities 106 may include any structures that house (e.g., enclose, support, etc.) network equipment 104. For example, network facilities 106 may include buildings, towers, etc. at which network equipment 104 is deployed.

Network facilities 106 are configured to provide one or more utilities for use by network equipment 104 deployed at those network facilities 106. As used herein, a "utility" may include anything that is useful to the deployment and/or operation of network equipment 104 at a network facility 106. For example, illustrative utilities may include physical space (e.g., floor space, shelf space, rack space, air space) at a network facility 106 at which network equipment 104 may be deployed, power (e.g., electrical power, backup electrical power, etc.) available at a network facility 106 and that may be provided for use by network equipment 104, electrically conductive connections at a network facility 106 (e.g., power outlets, cabling connections, etc.), ingress and/or egress data transport connections (e.g., a back haul connection) at a network facility 106, a temperature at a network facility 106 (e.g., ambient temperature such as air temperature in a room), a cooling utility or capacity at a network facility 106 that may be used to cool network equipment 104, and any other feature of a network facility 106 that may be used for deployment and/or operation of network equipment 104 at the network facility 106.

Workload management system 110 (system 110) may be configured to manage the workload of network equipment 104 of communication network 102 based at least in part on utilities at network facilities 106. To this end, system 110 may be communicatively coupled, in any suitable way, to network equipment 106, UE devices 108, other elements of communication network 102, and/or any other computing devices connected to communication network 102. Accordingly, system 110 may receive communications from and/or provide communications to any of network equipment 106, UE devices 108, other elements of communication network 102, and/or any other computing devices connected to communication network 102.

System 110 may be implemented in any suitable way. As an example, system 110 may be implemented as a computing system separate from and communicatively coupled to network equipment 106, UE devices 108, other elements of communication network 102, and/or any other computing devices connected to communication network 102. As another example, system 110, or at least portions of system 110, may be implemented by any of network equipment 106, other elements of communication network 102, and/or any other computing devices connected to communication network 102.

System 110 may be configured to manage the workload of network equipment 104 by identifying and performing workload management operations, which operations may include any operations that assign the workload (e.g., workload tasks of the workload) among network equipment 104. For example, system 110 may assign workload tasks (e.g., sets of workload tasks) to specific instances of network equipment 104 for handling (e.g., processing) by those specific instances of network equipment 104.

System 110 may be configured to assign workload among network equipment 104 in any suitable way. For example, system 110 may determine assignments of workload to be made in any of the ways described herein and provide data representative of the assignments to one or more computing devices (e.g., network equipment 104 and/or UE devices 108) configured to implement the assignments by directing workload tasks to specific network equipment 104 as indicated by the assignments. As another example, system 110 may itself direct workload tasks to specific network equipment 104 as indicated by the assignments. Directing workload tasks to specific network equipment 104 may include steering workload tasks, requests for the tasks, and/or network traffic associated with the workload tasks to specific network equipment 104. Such direction may be performed for initial assignments of workload tasks (e.g., initially assigning workload tasks to one or more instances of network equipment 104) and/or reassignments of the workload tasks (e.g., moving workload tasks from one instance of network equipment 104 to another instance of network equipment 104). Illustrative examples of assigning workload among network equipment 104 are described herein.

System 110 may obtain and use certain data to manage workload of network equipment 104, such as by assigning workload among network equipment 104 based on the data. FIG. 1 shows system 110 obtaining two illustrative examples of input data—resource utilization data 112 and utilities data 114. System 110 may use resource utilization data 112 and utilities data 114 to identify and perform one or more workload management operations, such as workload management operation 116 shown in FIG. 1, to assign workload among network equipment 104 of communication network 102.

Resource utilization data 112 may represent information about utilization of network resources such as network equipment 104. For example, resource utilization data 112 may indicate information about utilization of network resources such as computer processing resources (e.g., CPUs), computer memory, throughput, latency, etc. of network equipment 104 and/or other resources of communication network 102. Resource utilization data 112 may represent utilization of network resources in any suitable way, including as any quantified measure of use of the resources (e.g., utilization rate, utilization margin, ratio of used to available resources, etc.).

In certain examples, utilization of network resources may include and/or may be represented as one or more performance parameters, such as requested and/or measured throughput, latency, processing rate, etc. of network resources. Examples of performance parameters that may represent utilization of network resources include, without limitation, latencies with which service requests are fulfilled or are to be fulfilled, requested and/or measured processing latencies of network equipment 104, requested and/or measured data transport latencies (e.g., communication latencies between UE devices 108 and network equipment 104, between instances of network equipment 104, and the like), requested and/or measured data transport throughput rates, and requested and/or measured processing throughput rates.

In certain examples, at least some resource utilization data 112 may indicate real-time information about utilization of network equipment 104 and/or other resources of communication network 102. Such real-time information may represent real-time utilization and/or performance of network equipment 104 and/or communication network 102 at approximately a moment in time that resource utilization data 112 indicating the utilization and/or performance is obtained by system 110. In these examples, system 110 may obtain resource utilization data 112 in real-time, which may mean that resource utilization data 112 is obtained immediately and without undue delay, even if it is not possible for there to be absolutely zero delay. In certain examples, resource utilization data 112 may additionally or alternatively include information about historical utilization of network equipment 104.

System 110 may be configured to obtain resource utilization data 112 from any suitable source(s). For example, system 110 may be configured to obtain resource utilization data 112 from any computing system with which system 110 may communicate (e.g., by way of communication network 102 or another network), including network equipment 104, UE devices 108, computing systems associated with monitoring performance of communication network 102, and/or any other computing system from which resource utilization data 112 representing utilization of network resources may be obtained. As another example, system 110 may be configured to obtain resource utilization data 112 by deriving the resource utilization data 112 from other data, such as from raw data indicating performance parameter measurements, for example. Accordingly, system 110 may obtain resource utilization data 112 by receiving the data from one or more suitable sources and/or by generating the data based on data received from one or more suitable sources.

Utilities data 114 may represent any information about utilities at network facilities 106. For example, utilities data 114 may indicate availability (e.g., available capacity) and/or utilization (e.g., measured utilization, utilization margin, peak utilization, average utilization, etc.) of utilities at network facilities 106 and/or at geographic locations of the network facilities (e.g., a geographic area served by a power station that provides power to a network facility 106). Examples of information about utilities that may be indicated by utilities data 116 include information about physical space at a network facility 106 (e.g., space availability, utilization, etc.), information about electrical power at a network facility 106 and/or geographic area associated with the network facility 106 (e.g., power availability, utilization, peak usage, average usage, backup power availability, historical and/or daily peak-to-average usage, etc.), information about electrically conductive connections at a network facility 106 (e.g., number, positioning, availability, and/or utilization of power outlets, cabling connections, etc.), information about ingress and/or egress data transport connections (e.g., ingress/egress availability, utilization, etc.), information about ambient temperature at a network facility 106 (e.g., air temperature in a room and/or at specific regions or locations at a network facility 106), information about a cooling utility at a network facility 106 (e.g., cooling availability, utilization, cooling equipment capacity, etc.), and information about any other feature of a network facility 106 that may be used for deployment and/or operation of network equipment 104 at the network facility 106.

In certain examples, at least some utilities data 114 may indicate real-time information about utilities at network facilities 106. Such real-time information may represent real-time conditions of utilities at network facilities 106 as the conditions exist approximately at a moment in time that utilities data 114 indicating the conditions is obtained by system 110. In these examples, system 110 may obtain utilities data 114 in real-time, which may mean that utilities data 114 is obtained immediately and without undue delay, even if it is not possible for there to be absolutely zero delay. In certain examples, utilities data 114 may additionally or alternatively indicate information about historical utilization of utilities at network facilities 106.

In certain examples, at least some utilities data 114 may indicate availability and/or utilization of utilities at a network facility 106 as a dynamic function that may change over time. For example, power availability at a network facility 106 may be represented as a dynamic function that changes based on time of day, season, weather, etc.

Utilities data 114 may represent a utilization of a utility at a network facility 106 in any way suitable to quantify and/or qualify the use of the utility at the network facility 106. For example, the utilization may be represented as a metric value representing a quantified amount of use, a percentage or ratio representing how much of an available utility is being used, a margin representing how much of an available utility is not being used, a rating value representing a quality or efficiency with which a utility is being used, or any other suitable representation of the use of a utility at the network facility 106. In certain examples, a utilization of a utility at a network facility 106 may be represented as one or more maps that correlate utilization information to locations at the network facility 106.

A utilization of a utility at a network facility 106 may represent a past, current (e.g., real-time), and/or predicted utilization of the utility at the network facility 106. For example, system 110 may be configured to determine a past utilization of the utility at the network facility 106 based on historical data, a current utilization of the utility at the network facility 106 based on current data, and/or a predicted future utilization of the utility at the network facility 106 based on historical data (e.g., patterns of utilizations identified in historical utilities data 114) or a combination of historical and current data, and obtain utilities data 114 by generating the utilities data 114 to represent one or more of such determined utilizations. A utilization of a utility at a network facility 106 may include a utilization of any utility or utilities at the network facility 105, such as a utilization of power (e.g., electrical power), physical space, temperature, cooling, electrical connections, ingress/egress connections, or any other utility at the network facility 106.

System 110 may be configured to obtain utilities data 114 from any suitable source(s). For example, system 110 may be configured to obtain utilities data 114 from any computing system with which system 110 may communicate (e.g., by way of communication network 102 or another network), including a third-party computing system operated by a provider of a utility (e.g., a power company), a computing system that stores data representing information about network facilities 106 and/or utilities at network facilities 106 (static information such as a capacity of a utility at a network facility 106, historical information such as logs of utilization of a utility at a network facility 106, and/or real-time information such as current utilization of a utility at a network facility 106), and/or from any other computing system with which system 110 may communicate. As another example, system 110 may be configured to obtain utilities data 114 by deriving the utilities data 114 from other data received by system 110, such as from raw data indicating sensed conditions at network facilities 106, for example. Accordingly, system 110 may obtain utilities data 114 by receiving the data from one or more suitable sources and/or by generating the data based on data received from one or more suitable sources.

In certain examples, system 110 may be communicatively coupled to and configured to obtain sensor data from sensors at network facilities 106. The sensor data may be used by system 110 to generate utilities data 114 that indicates information about utilities at network facilities 106 and/or resource utilization data 112 that indicated information about utilization of network equipment 104 at network facilities 106.

The sensors may include any type or types of sensors that may be deployed at network facilities 106 and that are capable of sensing conditions at network facilities 106 and providing sensor data indicative of information about the sensed conditions. For example, the sensors may include temperature sensors, power sensors (e.g., power meters such as electrical current meters), audio sensors (e.g., microphones), humidity sensors, atmospheric pressure sensors (e.g., barometers), and/or imaging sensors. The sensors may include or be implemented by any suitable devices, such as IoT devices for example.

Imaging sensors may be implemented by one or more imaging devices, which may include any suitable type or types of imaging devices. For example, imaging devices may include visible light imaging devices (e.g., cameras such as video cameras and/or still-frame cameras), depth imaging devices (e.g., time-of-flight depth cameras, light detection and ranging (LIDAR) devices, stereoscopic cameras, etc.), and thermal imaging devices (e.g., forward-looking infrared (FLIR) cameras, etc.).

Any set and/or configuration of sensors may be deployed at a network facility 106 and used to sense conditions of the network facility 106 and provide sensor data that indicates information about the sensed conditions. For example, multiple types of imaging devices may be deployed at a network facility 106 and used to capture different types of imagery of the network facility 106. For instance, imagery of the network facility 106 may include visible light images (e.g., color or grayscale images in which data points represent color or grayscale values in a color space), depth images (e.g., images in which data points represent depth values from a camera viewpoint to imaged surfaces), and/or thermal images (e.g., images in which data points represent temperatures of an imaged space) of the network facility 106. Such imagery may be represented as image data that is produced by one or more imaging devices.

Figure 2:
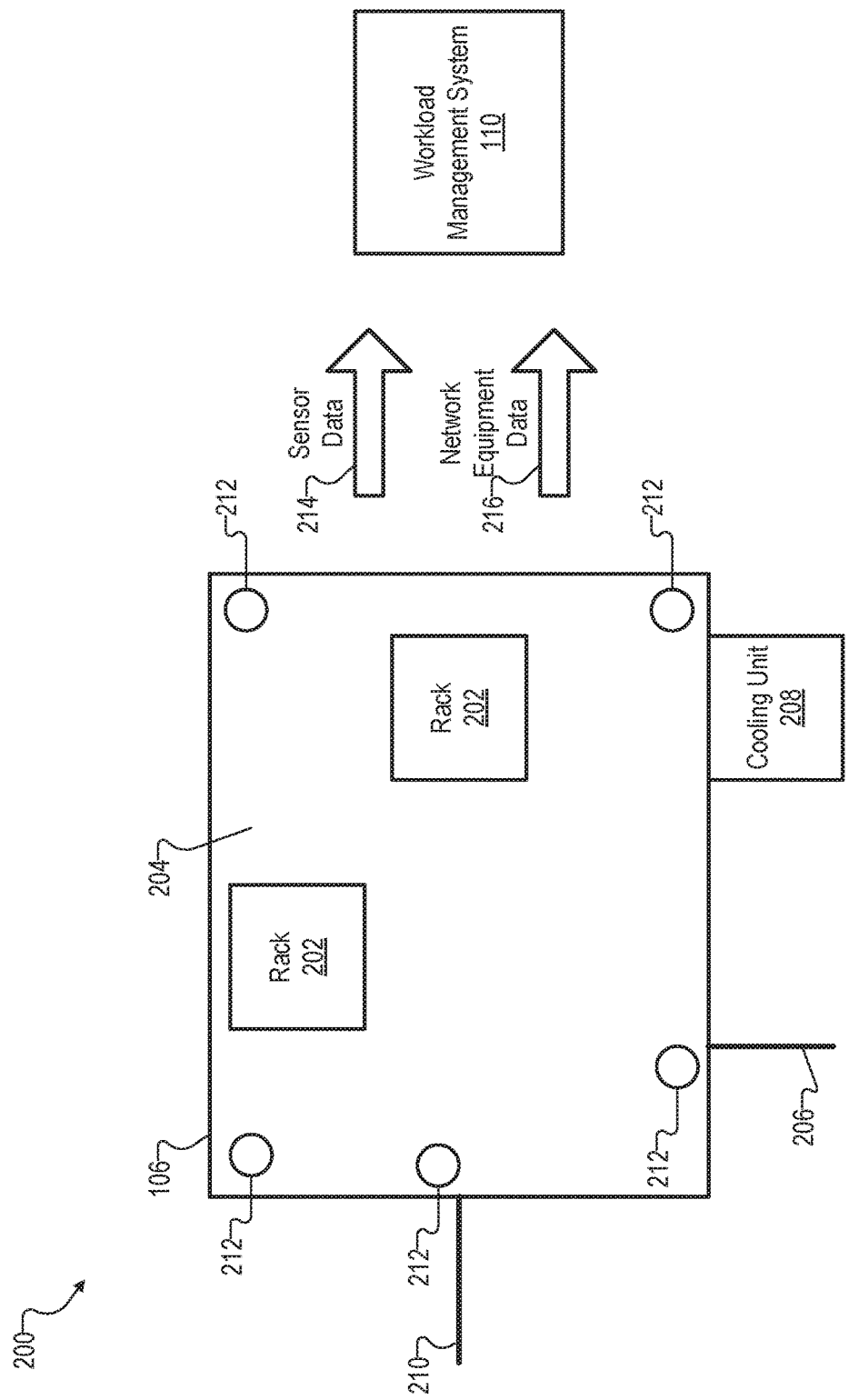
FIG. 2 shows an illustrative configuration of a network facility and a workload management system according to embodiments described herein.

FIG. 2 shows an illustrative configuration 200 of a network facility 106 and system 110. As shown, network facility 106 may include equipment racks 202 positioned within a space 204 (e.g., a floor space) in network facility 106. Racks 202 may house network equipment 104. Network facility 106 provides utilities for use by the network equipment 104, including space 204 that may be occupied by network equipment 104, incoming electrical power 206 that may be accessed and used by the network equipment 104, a cooling unit 208 that may cool the space 204 in network facility 106 (e.g., by forcing cool air into space 204), and a data ingress/egress connection 210 (e.g., a back haul connection) that may be used by the network equipment 104 to send and receive data to and from computing systems outside of the network facility 106. Network facility 106 may provide additional or alternative utilities not expressly shown in FIG. 2.

Network facility 106 further includes sensors 212 deployed at network facility 106. Sensors 212 may include any suitable combination and configuration of a type or types of sensors, including any of the illustrative sensors described herein. Sensors 212 are configured to sense conditions at network facility 106, generate sensor data 214 indicating the sensed conditions, and transmit the sensor data 214 to system 110.

One or more sensors 212 may include or be implemented as one or more imaging devices configured to capture and provide image data representing imagery of network facility 106 to system 110. The imagery may include any type or types of imagery of network facility 106, including any combination of different types of imagery of network facility 106. For example, the imagery may include one or more of color imagery, depth imagery, and/or thermal imagery of network facility 106. The imagery may depict features and/or conditions at network facility 106, such as a power meter, a temperature gauge, network equipment 104, racks, shelves, cooling vents, electrical connections, physical space, temperature, etc.

Figure 3:
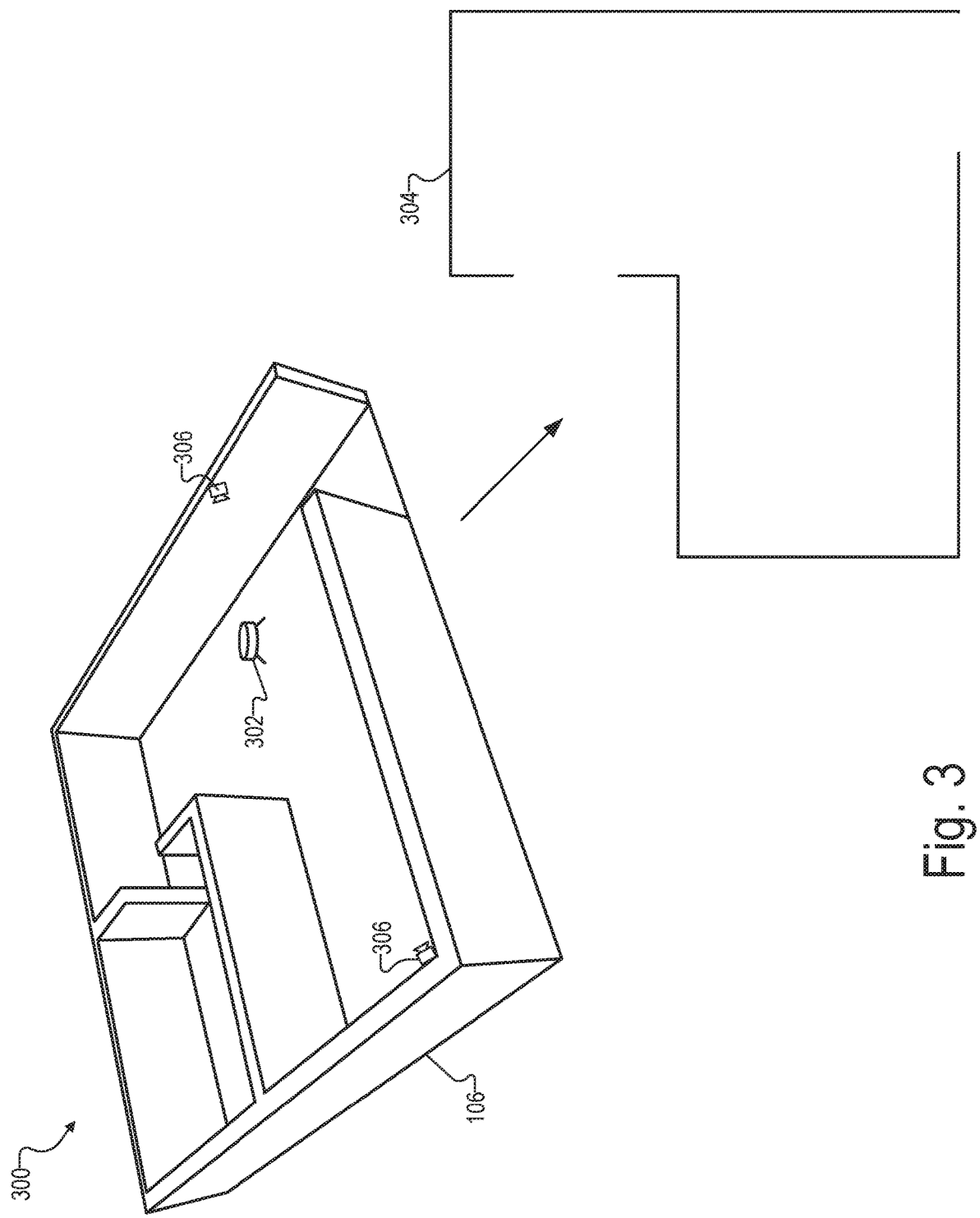
FIG. 3 shows an illustrative configuration for capturing imagery of a network facility according to embodiments described herein.

FIG. 3 shows an illustrative configuration 300 for capturing imagery of a network facility 106. In configuration 300, a space mapping device 302, such as a LIDAR device, is deployed at network facility 106 and is configured to capture depth images that may be used to generate a map of the physical space in a room of network facility 106, such as a floor space map 304 of the room. Configuration 300 further includes thermal imaging devices 306 deployed in network facility 106 and configured to capture thermal images that may be used to generate one or more maps of temperatures (e.g., a heat map) at network facility 106.

While configuration 300 shows space mapping device 302 and thermal imaging devices 306 deployed at network facility 106, this is illustrative only. Other examples may include additional or alternative types of imaging devices and/or other sensors. For example, although not shown, color imaging devices may be deployed at network facility 106 and configured to capture color images that may be used to generate one or more maps of visible light color values at network facility 106. For example, color imaging devices may be part of thermal imaging devices 306 or space mapping device 302, or color imaging devices may be separate devices deployed at network facility 106.

Returning to FIG. 2, system 110 may be configured to receive and use sensor data 214 to generate utilities data 114 that represents information about one or more of the utilities at network facility 106. Such utilities data 114 may include one or more maps of network facility 106 (e.g., a thermal map of network facility 106). In certain examples, system 110 may be further configured to receive and use sensor data 214 to generate resource utilization data 112 that represents utilization of network equipment 104 at network facility 106.

In addition, in certain examples system 110 may be configured to receive network equipment data 216 from network equipment 104 deployed at network facility 106. Certain network equipment data 216 may be a type of resource utilization data 112 that represents utilizations of the network equipment 104. Other network equipment data 216 may be used by system 110 to generate resource utilization data 112 that represents utilizations of the network equipment 104.

System 110 may manage the workload of network equipment 106 of communication network 102 in any of the ways described herein, including based on resource utilization data 112 and utilities data 114 obtained by system 110. To this end, system 110 may be implemented by computer resources such as servers, processors, memory devices, storage devices, communication interfaces, and so forth. For example, system 110 may be included within or otherwise associated with one or more multi-access servers or other computing systems (e.g., MEC servers, cloud servers, local servers, etc.) described herein. As such, a computing system implementing system 110 may be configured to manage the workload of network equipment 104 of communication network 102 by performing one or more workload management operations.

Figure 4:
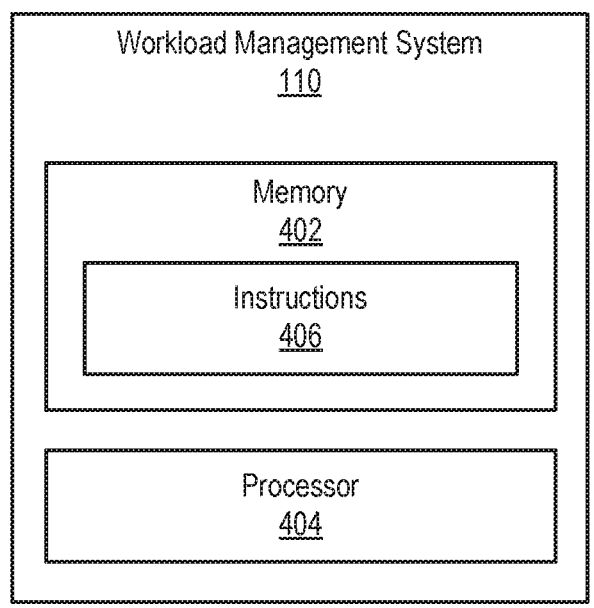
FIG. 4 shows an illustrative workload management system according to embodiments described herein.

FIG. 4 shows an illustrative workload management system 110. As shown, system 110 may include, without limitation, a memory 402 and a processor 404 selectively and communicatively coupled to one another. Memory 402 and processor 404 may each include or be implemented by computer hardware that is configured to store and/or execute computer software. Various other components of computer hardware and/or software not explicitly shown in FIG. 4 may also be included within system 110. In some examples, memory 402 and processor 404 may be distributed between multiple devices and/or multiple locations.

Memory 402 may store and/or otherwise maintain executable data used by processor 404 to perform any of the functionality of system 110 described herein. For example, memory 402 may store instructions 406 that may be executed by processor 404. Memory 402 may be implemented by one or more memory or storage devices, including any memory or storage devices described herein, that are configured to store data in a transitory or non-transitory manner. Instructions 406 may be executed by processor 404 to cause system 110 to perform any of the functionality of system 110 described herein. Instructions 406 may be implemented by any suitable application, software, code, and/or other executable data instance. Additionally, memory 402 may also maintain any other data accessed, managed, used, and/or transmitted by processor 404.

Processor 404 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 404 (e.g., when processor 404 is directed to perform operations represented by instructions 406 stored in memory 402), system 110 may perform functions associated with workload management as described herein and/or as may serve a particular implementation.

In certain examples, system 110 may obtain resource utilization data 112 representing utilization of network equipment 104 of communication network 102, obtain utilities data 114 representing information about utilities at network facilities 106 at which the network equipment 104 is deployed, and identify and perform one or more workload management operations 116 for communication network 102 based on the resource utilization data 112 and the utilities data 114. The one or more workload management operations 116 may include system 110 assigning a workload among the network equipment 104 deployed at the network facilities 106. Illustrative examples of these functions of system 110 will now be described.

While certain of the examples refer to obtaining utilities data 114 representing information about utilities at multiple network facilities 106, any suitable number, type, and/or combination of utilities at any suitable number and combination of network facilities 106 may be represented by the utilities data 114 and used to identify and perform any suitable number and combination of workload management operations. While multiple network facilities 106 are referred to in the examples, the functionality may be applied to a single network facility 106 (e.g., based on utilities data 114 specific to the single network facility 106) and/or multiple network facilities 106 (e.g., based on an aggregate of utilities data 114 for multiple network facilities 106).

Based on obtained resource utilization data 112 and utilities data 114, system 110 may assign a workload among the network equipment 104 deployed at the network facilities 106. For example, based on the obtained data, system 110 may identify specific network equipment 104 to which to assign specific workload tasks included in the workload. For instance, system 110 may direct workload tasks to and/or from different instances of network equipment 104 deployed at different network facilities 106, such as by directing a first workload task to or from a first instance of network equipment 104 deployed at a first network facility 106 and directing a second workload task to or from a second instance of network equipment 104 deployed at a second network facility 106. System 110 may be configured to assign workload tasks among network equipment 104 in any suitable way that considers information about utilities at network facilities 106 and that may help optimize communication network 102, the handling of the workload by the communication network 102, and/or the utilization of utilities at network facilities 106 (e.g., by helping to optimize, conserve, load balance, or otherwise improve utilization of utilities at network facilities 106).

In certain examples, utilities data 114 may represent a utilization of electrical power at network facilities 106, and system 110 may be configured to assign the workload among network equipment 104 deployed at the network facilities 106 based at least in part on the utilization of electrical power at network facilities 106. As an example, system 110 may direct the workload to particular network equipment 104 deployed at a particular network facility 10 of the network facilities 106 based at least in part on the utilization of electrical power (e.g., utilization margin and/or availability of electrical power) at the particular network facility 106. For example, system 110 may direct the workload to the particular network equipment 104 deployed at the particular network facility 106 based at least in part on the network facility 106 having at least a defined amount of electrical power available (e.g., utilization of the power at the network facility 106 is below a defined threshold utilization, meaning that the network facility 106 has sufficient power available for handling additional workload).

As another example, system 110 may direct the workload away from particular network equipment 104 deployed at a particular network facility 106 of the network facilities 106 based at least in part on a lack of available electrical power at the particular network facility 106. For example, system 110 may direct the workload away from the particular network equipment 104 deployed at the particular network facility 106 based at least in part on the network facility 106 not having at least a defined amount of electrical power available (e.g., utilization of the power at the network facility 106 is above a defined threshold utilization or would be above the defined threshold utilization if the workload were assigned to the particular network equipment 104 at the network facility 106, meaning that the network facility 106 has insufficient power available for handling additional workload).

As another example, system 110 may direct the workload away from a first particular network equipment 104 deployed at a first particular network facility 106 of the network facilities 106 and to a second particular network equipment 104 deployed at a second particular network facility 106 of the network facilities 106 based at least in part on the first network facility 106 having less available power than the second network facility 106. For example, system 110 may direct the workload away from the first particular network equipment 104 deployed at the first particular network facility 106 based at least in part on the second network facility 106 having at least a defined threshold amount of more power available than the first network facility 106.

In certain examples, utilities data 114 may represent a utilization of ambient temperature at network facilities 106, and system 110 may be configured to assign the workload among network equipment 104 deployed at the network facilities 106 based at least in part on the utilization of ambient temperature at network facilities 106. As an example, system 110 may direct the workload to particular network equipment 104 deployed at a particular network facility 10 of the network facilities 106 based at least in part on the utilization of ambient temperature electrical power (e.g., current and/or predicted ambient temperature or change in ambient temperature) at the particular network facility 106.

Utilities data 114 may represent a utilization of any other utility or utilities at network facilities 106, including any of the illustrative types of utilities described herein (e.g., backhaul circuit capacity, cooling capacity, etc.). In certain examples, utilities data 114 may represent a utilization of multiple different types of utilities at network facilities 106, and system 110 may be configured to assign the workload among network equipment 104 deployed at the network facilities 106 based at least in part on the utilization of the multiple different types of utilities at network facilities 106. As an example, system 110 may direct the workload to particular network equipment 104 deployed at a particular network facility 10 of the network facilities 106 based at least in part on the utilization of the multiple different types of utilities at network facilities 106. In certain examples, the system 110 may be configured to use the utilization of the multiple different types of utilities at network facilities 106 to generate a net utilization for each of the network facilities 106. In such examples, system 110 may be configured to assign the workload among network equipment 104 deployed at the network facilities 106 based at least in part on the net utilizations of the network facilities 106. Any suitable combination of utilization of different utilities may be used in such examples (e.g., a combination of power and ambient temperature utilizations).

In certain examples, system 110 may be configured to assign the workload among network equipment 104 deployed at the network facilities 106 based on a specific combination of resource utilization data 112 and utilities data 114. System 110 may be configured to do this based on any suitable specific combination of resource utilization data 112 and utilities data 114. As an example, an ordered combination may be employed, such as a ordered combination in which resource utilization data 112 is used to identify candidate network equipment 104 and then utilities data 114 is used to select, from the candidate network equipment 104, to which network equipment 104 the workload will be assigned. As another example, a different ordered combination may be employed in which utilities data 114 is used to disqualify candidate network equipment 104 from consideration for the workload (e.g., based on a utilization of a utility exceeding a defined threshold) and then selecting, from the remaining candidate network equipment 104, to which network equipment 104 the workload will be assigned. As another example, a weighted combination may be employed in which resource utilization data 112 and utilities data 114 are given weights that determine the extent to which each of the resource utilization data 112 and the utilities data 114 contributes to system 110 determining an assignment of the workload.

In certain examples, system 110 may be configured to dynamically adjust a specific combination of resource utilization data 112 and the utilities data 114 used for workload management based on one or more factors, such as by dynamically adjusting the weights used in a weighted combination based on one or more factors. Such factors may include a utilization of a utility at a network facility 106. For example, system 110 may be configured to increase the weight given to utilities data 114 when the utilization of a utility at a network facility 106 increases. To illustrate, system 110 may determine, based on utilities data 114, that a utilization of a utility at a network facility 106 has reached a defined threshold. In response, system 110 may increase a weight given to the utilities data 114 in a weighted combination of the resource utilization data 112 and the utilities 114. System 110 may also be configured to decrease the weight given to the utilities data 114 when the utilization of a utility at a network facility 106 decreases, such as in response to the utilization of the utility decreasing below a defined threshold. As another example, system 110 may be configured to dynamically adjust an ordered combination based on one or more factors. For example, filtering candidate network equipment based on utilities data 114 may be moved ahead of filtering candidate network equipment based on resource utilization data 112 in response to utilities data 114 indicating that a utilization of one or more utilities has exceeded a defined threshold.

In certain examples, resource utilization data 112 may indicate latencies associated with network equipment 104 at network facilities 106, and utilities data 114 may indicate utilization of a utility such as electrical power at network facilities 106. System 110 may be configured to assign the workload among network equipment 104 deployed at the network facilities 106 based on a combination of the latencies and the utilization of electrical power. Any suitable combination may be used by system 110, such as a weighted combination in which the latencies and the utilization of electrical power are given weights that indicate the extent to which each of the latencies and the utilization of electrical power contributes to system 110 determining an assignment of the workload, or an ordered combination in which latencies are used to identify candidate network equipment 104 and the electrical power utilization is considered to select from the candidate network equipment 104, or in which the electrical power utilization is used to disqualify candidate network equipment 104 and latencies are then used to select from the remaining candidate network equipment 104. Based on the combination of the latencies and the utilization of electrical power, system 110 may assign the workload among network equipment 104, such as by directing a workload task to particular network equipment 104 deployed at a particular network facility 106.

To illustrate one example, system 110 may obtain information about a workload that is to be assigned among network equipment 104, such as a workload associated with a request from a UE device 108. System 110 may also obtain resource utilization data 112 indicating latencies associated with network equipment 104 and utilities data 114 indicating utilization of electrical power at network facilities 106 at which the network equipment 104 is deployed. One or more of the latencies may be associated with fulfillment of the request from the UE device 108 by network equipment 104 (e.g., latencies of communications between the UE device 108 and instances of network equipment 104). Based on the latencies and on information about the workload and/or request (e.g., required latencies for fulfilling the request), system 110 may determine candidate instances of network equipment 104 that are able to meet the requirements. System 110 may then select, from the candidate instances of network equipment 104 and based on the utilization of electrical power at the network facilities 106 at which the candidate instances of network equipment 104 are deployed, one or more instances of network equipment 104 to which the workload will be assigned. For example, system 110 may select one or more instances of network equipment 104 deployed at network facilities 106 having relatively lower electrical power utilizations and/or relatively more power available than other network facilities 106 at which other candidate instances of network equipment 104 are deployed. System 110 may then assign the workload to the selected instance(s) of network equipment 104. In this or another manner, system 110 may be configured to jointly optimize latencies and power utilization, such as by balancing the optimization of power utilization and the effect on latencies (e.g., increased latencies due to optimization of power utilization.

In certain examples, system 110 may be configured to apply predictive analytics to resource utilization data 112 and/or utilities data 114 as part of managing workload based on the resource utilization data 112 and utilities data 114. For example, based on the resource utilization data 112 and/or utilities data 114, system 110 may analyze and predict future resource and/or utilities utilizations and then use the predictions to manage workload. For example, system 110 may assign workload based predicted resource and/or utilities utilizations to level certain loads (e.g., predicted power usage loads). To illustrate, system 110 may move workload away from network equipment 104 deployed at a particular network facility 106 based on a predicted increase in ambient temperature (e.g., heat) at the network facility 106.

In certain examples, system 110 may implemented or be implemented by a workload orchestration system configured to orchestrate placement of workload. For example, system 110 may implement or be implemented as an intelligent algorithm configured to selectively orchestrate placement of workload based on various factors, and one or more of the factors may be information about utilities at network facilities 106 as described herein. In such examples, system 110 may be able to place workload in a manner that creates available capacity (e.g., utility capacity and/or network equipment 104 capacity) where helpful and/or predicted to be helpful. For example, system 110 may be configured to determine, based on resource utilization data 112 and/or utilities data 114, a trend in utilization of a utility (e.g., power) and assign workload based at least in part on the trend.

In certain examples, system 110 may be configured to use resource utilization data 112 and/or utilities data 114 to prioritize workload tasks, such as by using historical power usage of network equipment 104 and/or workload tasks to prioritize what workload tasks are given precedence over other workload tasks at times of increased power utilization (e.g., peak power consumption). System 110 may do this in a manner that provides a tradeoff between an instance of network equipment 104 and/or a workload task that uses a certain amount of power versus other network equipment 104 and/or workload tasks that use less power. This may allow more workload tasks to be accommodated at the expense of a high-power consuming instance of network equipment 104 and/or workload task.

Examples of utilities-based workload management described herein may be particularly useful for network facilities 106 that are located at an edge of a provider network to support low-latency communication with UE devices 108. Such network facilities 106 may house network equipment 104 such as MEC servers that require significant power and generate significant heat, but may be located where available utilities are limited (e.g., where only a finite amount of power is available at a network site).

Figure 5:
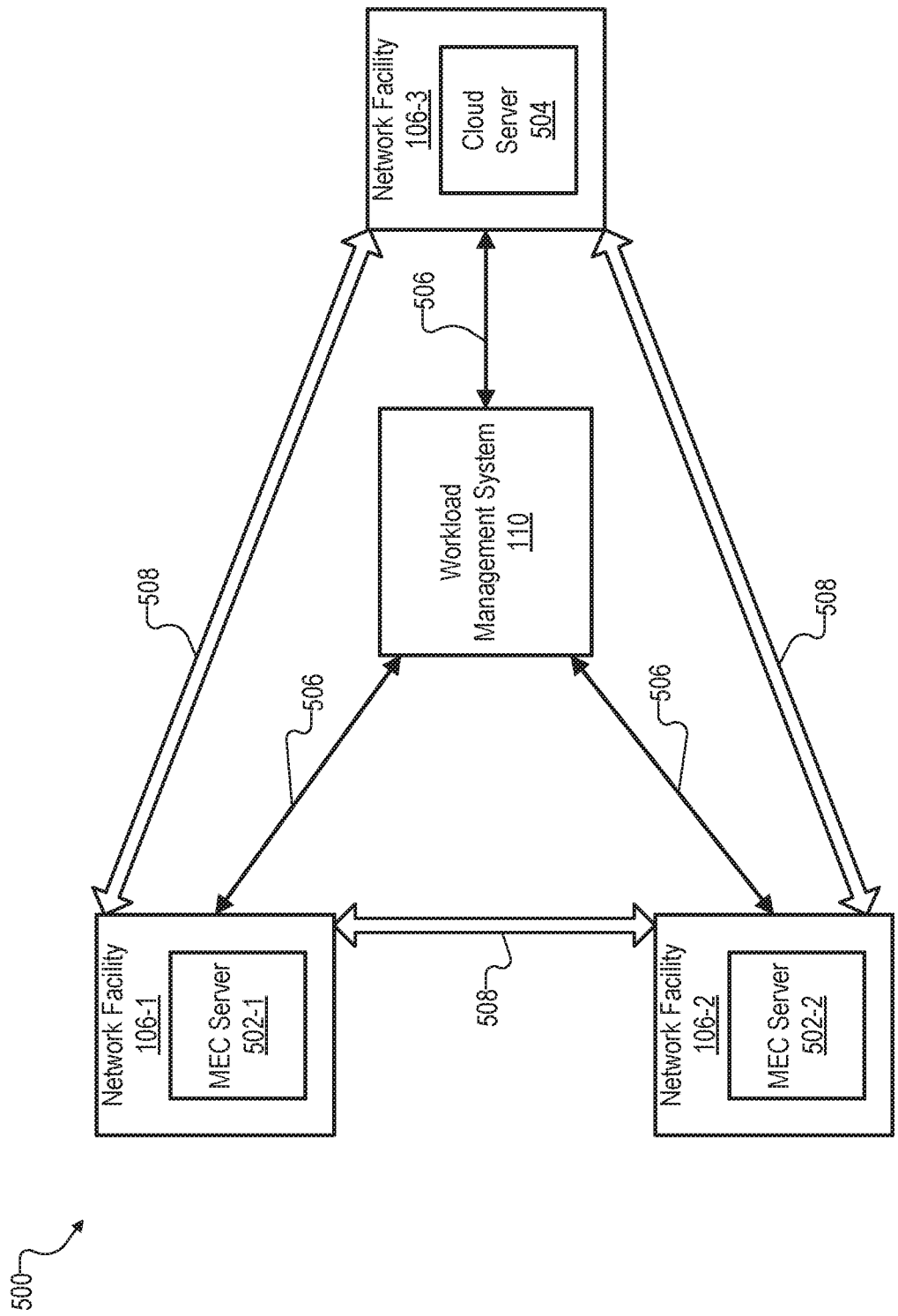
FIGS. 5-6 show illustrative configurations of certain network equipment deployed at network facilities and a workload management system according to embodiments described herein.

FIG. 5 shows an illustrative configuration 500 of specific network equipment of a communication network. As shown, the network equipment includes MEC servers 502-1 and 502-1 (collectively "MEC servers 502") deployed at network facilities 106-1 and 106-2, and a cloud server 504 deployed at network facility 106-3. MEC servers 502-1 and 502-1 and network facilities 106-1 and 106-2 are located at an edge of the communication network, while cloud server 504 and network facility 106-3 are located farther from the edge of the communication network than MEC servers 502-1 and 502-1 and network facilities 106-1 and 106-2. Accordingly, latencies of communications between a UE device 108 near the edge of the communication network and MEC servers 502-1 and 502-2 will be smaller than latencies of communications between the UE device 108 and cloud server 504.

System 110 is communicatively coupled to MEC servers 502 and cloud server 504, which couplings are indicated by arrows 506 in FIG. 5. Accordingly, system 110 can communicate with MEC servers 502 and cloud server 504, which communications may support system 110 managing the workload of MEC servers 502 and cloud server 504 in any of the illustrative ways described herein. For example, system 110 may obtain resource utilization data 112 and utilities data 114 associated with MEC servers 502 and cloud server 504 and the network facilities 106 at which MEC servers 502 and cloud server 504 are deployed. System 110 may assign workload among MEC servers 502 and cloud server 504 based on the resource utilization data 112 and utilities data 114. In certain examples, the assignments may include directing (e.g., moving) workload tasks between MEC servers 502 and cloud server 504 based at least in part on information about utilities at the network facilities 106. Arrows 508 represent movement of workload between MEC servers 502 and cloud server 504.

In certain examples, system 110 may direct a workload task to or from MEC server 502-1 based on the resource utilization data 112 and utilities data 114. As an example, system 110 may direct the workload task from MEC server 502-1 to cloud server 504. For instance, the workload task me be latency-tolerant such that a latency associated with cloud server 504 may be acceptable for the workload task. System 110 may determine that the latency associated with cloud server 504 is acceptable for the workload task and direct the workload task away from MEC server 502-1 to cloud server 504 based on the resource utilization data 112 and utilities data 114 (e.g., to conserve a utility at network facility 106-1). As another example, system 110 may direct the workload task from MEC server 502-1 to MEC server 502-2 based on the resource utilization data 112 and utilities data 114 (e.g., to conserve a utility at network facility 106-1). For instance, the workload task me be latency-sensitive such that a latency associated with cloud server 504 may be unacceptable for the workload task. System 110 may determine that the latency associated with cloud server 504 is unacceptable for the workload task and direct the workload task away from MEC server 502-1 to MEC server 502-2 based on network facility 106-2 having more available capacity of a utility than network facility 106-1.

Figure 6:
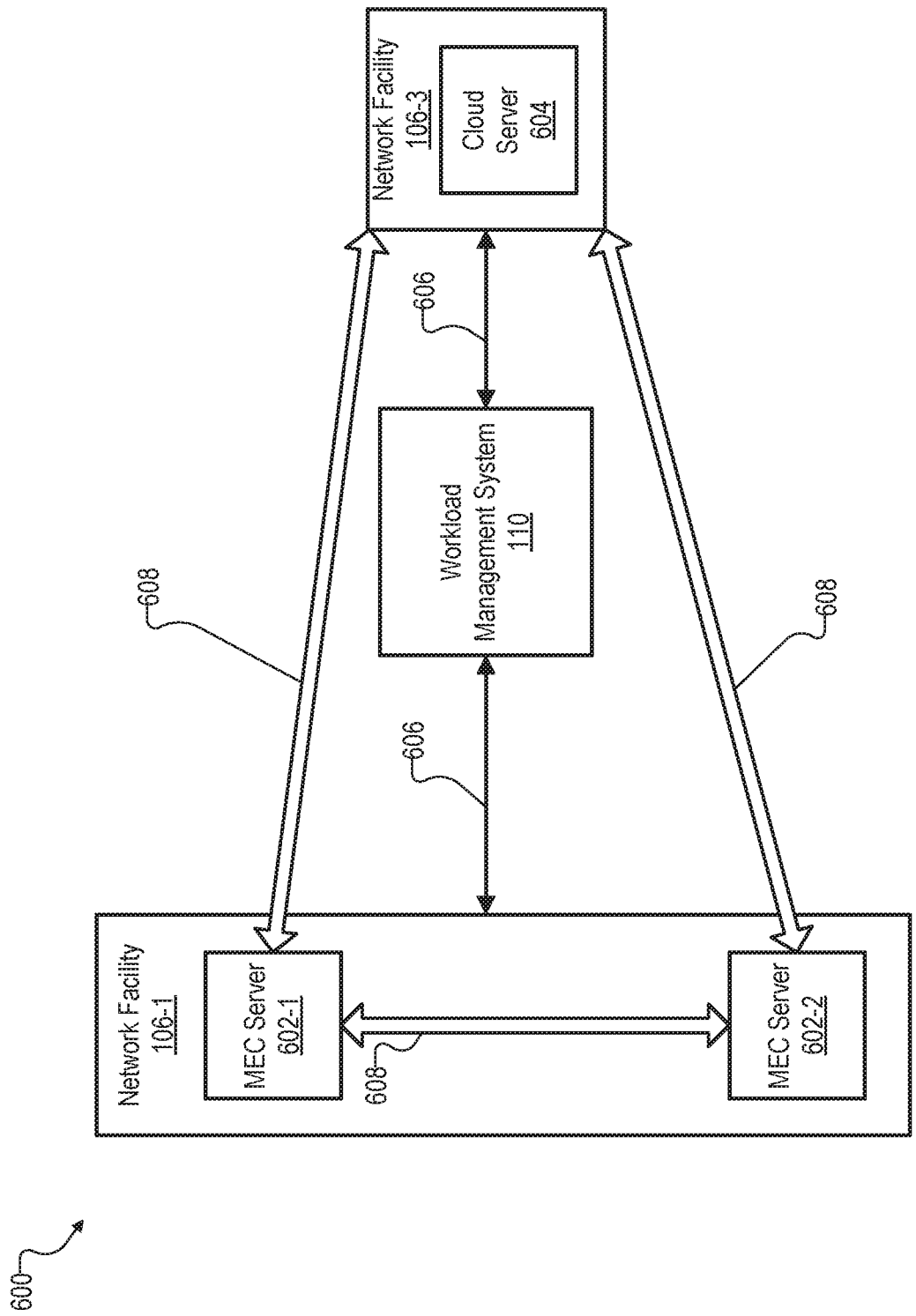

FIG. 6 shows an illustrative configuration 600 of specific network equipment of a communication network. As shown, the network equipment includes MEC servers 602-1 and 602-1 (collectively "MEC servers 602") deployed at a network facility 106-1, and a cloud server 604 deployed at another network facility 106-2. MEC servers 602-1 and 602-1 and network facility 106-1 are located at an edge of the communication network, while cloud server 604 and network facility 106-2 are located farther from the edge of the communication network than MEC servers 602-1 and 602-2 and network facility 106-1. Accordingly, latencies of communications between a UE device 108 near the edge of the communication network and MEC servers 602-1 and 602-2 will be smaller than latencies of communications between the UE device 108 and cloud server 604.

System 110 is communicatively coupled to MEC servers 602 and cloud server 604, which couplings are indicated by arrows 606 in FIG. 6. Accordingly, system 110 can communicate with MEC servers 602 and cloud server 604, which communications may support system 110 managing the workload of MEC servers 602 and cloud server 604 in any of the illustrative ways described herein. For example, system 110 may obtain resource utilization data 112 and utilities data 114 associated with MEC servers 602 and cloud server 604 and the network facilities 106 at which MEC servers 602 and cloud server 604 are deployed. System 110 may assign workload among MEC servers 602 and cloud server 604 based on the resource utilization data 112 and utilities data 114. In certain examples, the assignments may include directing (e.g., moving) workload tasks between MEC servers 602 and cloud server 604 based at least in part on information about utilities at the network facilities 106. Arrows 608 represent movement of workload between MEC servers 602 and cloud server 604.

In certain examples, system 110 may direct a workload task to or from MEC server 602-1 based on the resource utilization data 112 and utilities data 114. As an example, the direction may include system 110 directing the workload task from MEC server 602-1 to cloud server 604 as described herein. As another example, the direction may include system 110 directing the workload task from MEC server 602-1 to another MEC server 602-2 located at the same network facility 106-1. Such granular direction of workload tasks within a network facility 106-1 may be performed by system 110 for any suitable benefit. For example, ambient temperature at the network facility 106-1 may be high generally or high at a location where MEC serer 602-1 is positioned within the network facility 106-1. System 110 may determine the high ambient temperature based on utilities data 114 and, in response, move the workload task from MEC server 602-1 to MEC server 602-2. This may be beneficial if the ambient temperature near MEC server 602-2 is less than the ambient temperature near MEC server 602-1, or if movement of workload tasks away from MEC server 602-1 may allow the operations of MEC server 602-1 to be reduced or stopped (and possibly MEC server 602-1 turned off or transitioned to another lower-power-usage state).

In certain examples, system 110 may be configured to detect, based on utilities data 114, a failure of a cooling utility at a network facility 106. In response to detecting the failure, system 110 may use utilities data 114 to monitor for an increase in ambient temperature at the network facility 106. If system 110 detects a rise in the ambient temperature to satisfy a defined threshold (e.g., the temperature rises by at least one degree or rises by at least a defined rate), system 110 may perform one or more management operations such as moving workload away from network equipment 104 at the network facility 106 and optionally shutting down the network equipment 104.

In addition to using resource utilization data and utilities data 114 to manage workload, in certain examples system 110 may be configured to use any other suitable data (e.g., in combination with the resource utilization data 112 and/or utilities data 114) to manage workload. Illustrative examples of additional data that system 110 may use to manage workload include, without limitation, application data, RAN data, subscription data, and environmental data.

Application data may indicate information about applications running on network equipment 104. For example, application data may indicate actual network traffic corresponding to applications, required latencies and/or throughput for applications, etc. System 110 may be configured to use such application data together with other data (e.g., utilities data 114, subscription data, network data, etc.) to manage workload.

RAN data may indicate any information about resources of a RAN, including information about performance of RAN resources. For example, RAN nodes and optionally core network elements may exchange RAN data as part of new radio (NR) self-optimizing network (SON) operations. For instance, RAN nodes may exchange and use RAN data for handovers of UE devices 108 and/or managing operation of certain RAN resources. RAN data, or at least a portion of the RAN data, may be provided to system 110 and used by system 110 to manage workload. System 110 may be configured to manage workload of MEC servers, for example, based on utilities data 114 and RAN data, which workload management may allow utilities to be managed, such as by turning MEC servers or components of MEC servers on, off, up, or down (e.g., to optimize power utilization at the network facility 106).

Subscription data may indicate subscription information about network users, such as information indicating subscriptions of users to data and/or services that may be accessed by way of communication network 102. For example, subscription data may indicate a number of subscribed users and types of services to which users are subscribed. For example, a video service provider may provide subscription data to a network provider such that system 110 has access to the subscription data. System 110 may be configured to use the subscription data to determine a number of different types of subscribers located in a geographic area of communication network 102 (e.g., in a cell of communication network 102). System 110 may be configured to use such subscription data together with other data (e.g., utilities data 114, subscription data, application data, etc.) to manage workload.

Environmental data may indicate any information about environmental conditions or factors associated with a network facility 106. Illustrative examples of such environmental information include, without limitation, information about outside air temperature, storm conditions, actual weather, forecast weather, etc. associated with a geographic location at which the network facility 106 is located. System 110 may be configured to use such environmental data together with other data (e.g., utilities data 114, subscription data, application data, etc.) to manage workload.

Figure 7:
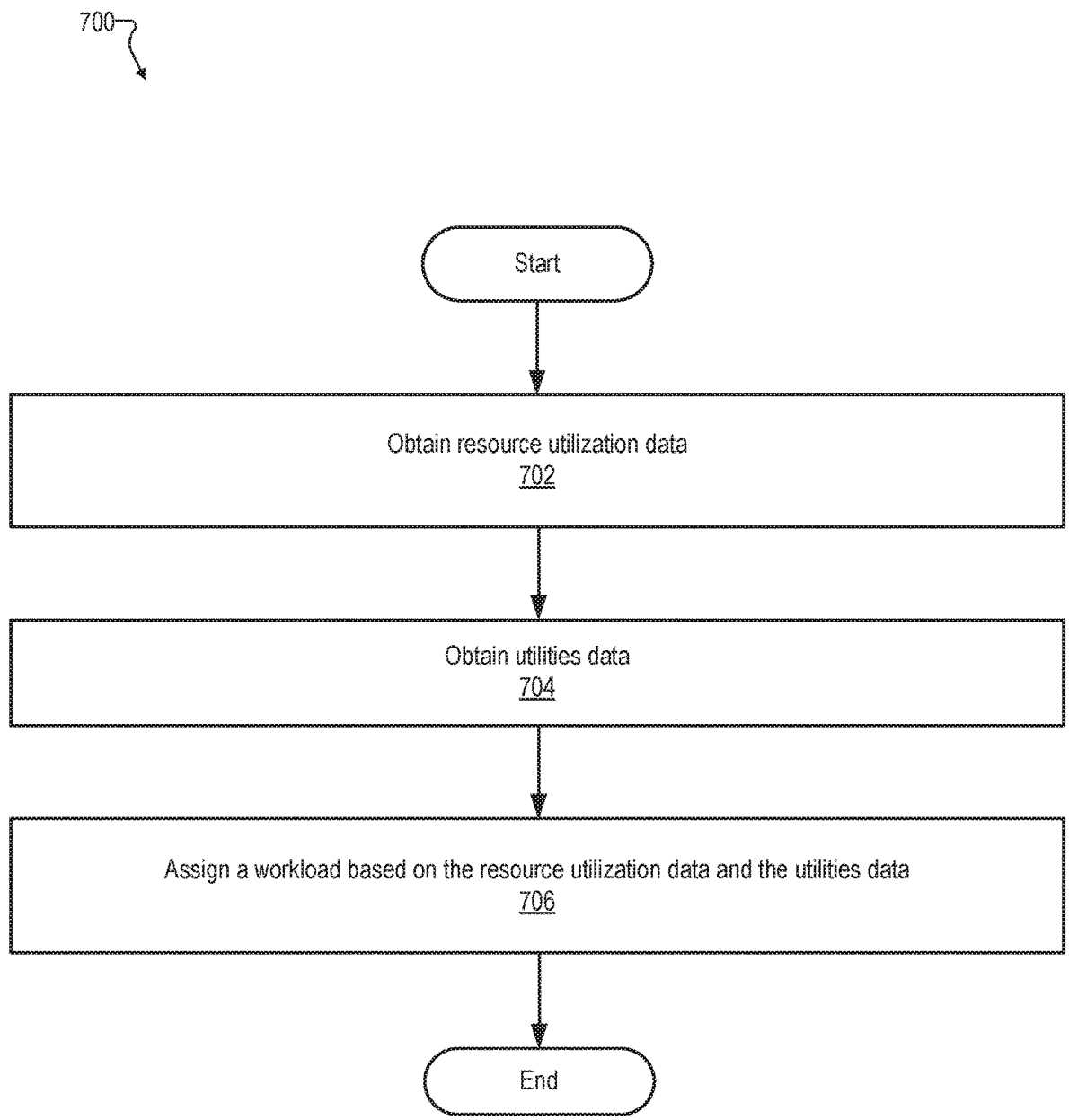
FIG. 7 shows an illustrative method for workload management according to embodiments described herein.

FIG. 7 illustrates an example method 700. While FIG. 7 illustrates example operations according to one embodiment, other embodiments may omit, add to, reorder, combine, and/or modify any of the operations shown in FIG. 7. In some examples, multiple operations shown in FIG. 7 or described in relation to FIG. 7 may be performed concurrently (e.g., in parallel) with one another, rather than being performed sequentially as illustrated and/or described. One or more of the operations shown in FIG. 7 may be performed by a workload management system such as system 110 and/or any implementation thereof.

In operation 702, a workload management system obtains resource utilization data. The workload management system may obtain the resource utilization data in any of the ways described herein. The resource utilization data may represent utilization of one or more resources of a communication network, such as utilization of network equipment 104, as described herein. Operation 702 may be performed in any of the ways described herein.

In operation 704, the workload network management system obtains utilities data. The workload management system may obtain the utilities data in any of the ways described herein. The utilities data may represent information about one or more utilities at network facilities at which the network equipment 104 is deployed, as described herein. 704 may be performed in any of the ways described herein.

In operation 706, the workload network management system assigns a workload based on the resource utilization data and the utilities data. The workload management system may assign, or otherwise manage, the workload based on the data in any of the ways described herein such that the workload is assigned based at least in part on information about one or more utilities at one or more network facilities 106. Operation 706 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 8:
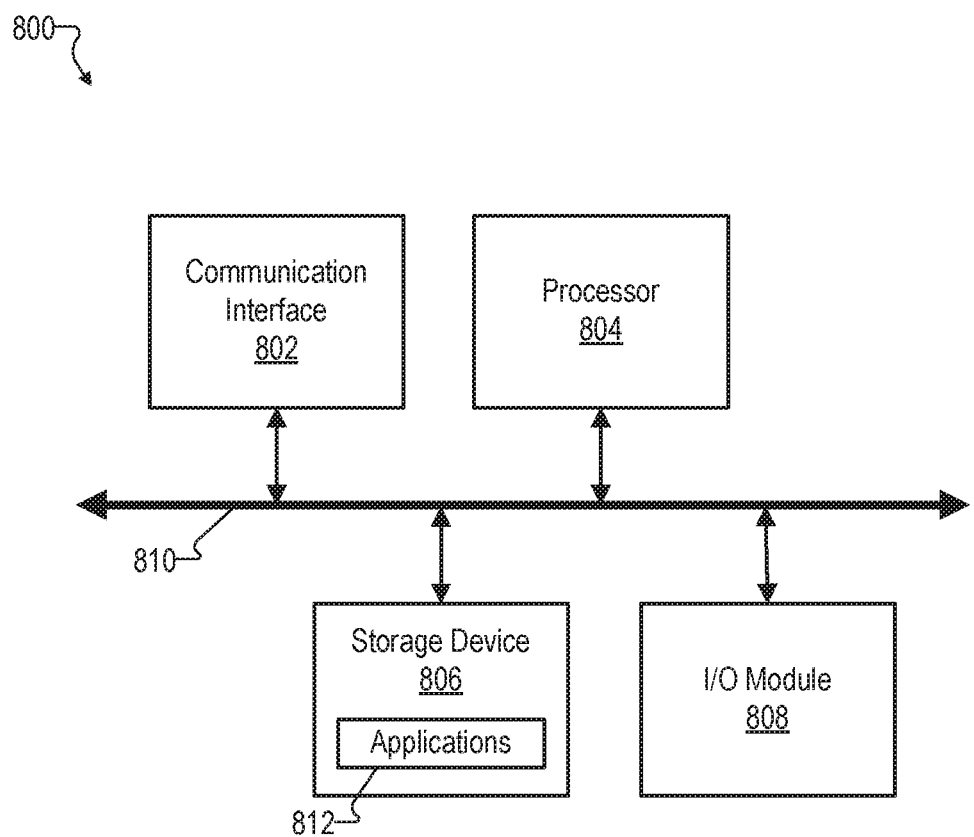
FIG. 8 shows an illustrative computing device according to embodiments described herein.

FIG. 8 shows an illustrative computing device 800 that may be specifically configured to perform one or more of the processes described herein. For example, computing device 800 may include or implement (or partially implement) a utilities-based network management system such as system 110 or any component included therein (e.g., a client exposure service system such as client exposure service system 402, a service registry system such as service registry system 404, a network anchor service system such as network anchor service system 406, a server selection system such as server selection system 408, etc.), an application development system such as application development system 412, a multi-access server such as one of multi-access servers 304, a client device such as one of client devices 306, or any other computing systems or devices described herein.

As shown in FIG. 8, computing device 800 may include a communication interface 802, a processor 804, a storage device 806, and an input/output (I/O) module 808 communicatively connected via a communication infrastructure 810. While an illustrative computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 806. For example, data representative of one or more executable applications 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. One or more I/O modules may be used to receive input for a single virtual experience. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with processor 404 of system 110. Likewise, memory 402 of system 110 may be implemented by or within storage device 806.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   obtaining, by a workload management system, resource utilization data representing utilization of network equipment of a communication network;
   obtaining, by the workload management system, utilities data representing information about utilities at network facilities at which the network equipment is deployed; and
   assigning, by the workload management system based on the resource utilization data and the utilities data, a workload among the network equipment deployed at the network facilities, wherein assigning the workload among the network equipment deployed at the network facilities comprises
   assigning, based on a first ordered combination of the resource utilization data followed by the utilities data when the utilities data indicates that a utilization of a utility does not satisfy a defined threshold, a first workload among the network equipment deployed at the network facilities, and
   assigning, based on a second ordered combination of the utilities data followed by the resource utilization data when the utilities data indicates that the utilization of the utility satisfies the defined threshold, a second workload among the network equipment deployed at the network facilities.

2. The method of claim 1, wherein:
   the communication network comprises a provider network operated by a network provider;
   the network facilities comprise a network facility located at an edge of the provider network;
   the network equipment comprises a multi-access edge computing (MEC) server deployed at the network facility located at the edge of the provider network; and
   assigning the workload among the network equipment deployed at the network facilities comprises directing a workload task to or from the MEC server based on the resource utilization data and the utilities data.

3. The method of claim 2, wherein:
   the network facilities comprise an additional network facility located farther from the edge of the provider network than the network facility located at the edge of the provider network;
   the network equipment comprises a multi-access cloud server deployed at the additional network facility; and
   directing the workload task to or from the MEC server based on the resource utilization data and the utilities data comprises moving the workload task from the MEC server deployed at the network facility to the multi-access cloud server deployed at the additional network facility.

4. The method of claim 2, wherein:
   the network facilities comprise an additional network facility located at the edge of the provider network;
   the network equipment comprises an additional MEC server deployed at the additional network facility; and
   directing the workload task to or from the MEC server based on the resource utilization data and the utilities data comprises moving the workload task from the MEC server deployed at the network facility to the additional MEC server deployed at the additional network facility.

5. The method of claim 1, wherein the utilities data represents utilization of electrical power at the network facilities.

6. The method of claim 1, wherein the utilities data represents utilization of cooling capacities at the network facilities.

7. The method of claim 1, wherein:
   the resource utilization data represents latencies associated with the network equipment;
   the utilities data represents utilization of electrical power at the network facilities; and
   assigning the workload among the network equipment based on the resource utilization data and the utilities data comprises directing a workload task to particular network equipment deployed at a particular network facility of the network facilities based on a combination of the latencies associated with the network equipment and the utilization of electrical power at the network facilities.

8. The method of claim 1, wherein assigning the workload among the network equipment based on the weighted combination of the resource utilization data and the utilities comprises:
 determining, based on the utilities data, that the utilization of the utility has reached the defined threshold;
 reconfiguring, in response to determining that the utilization of the utility has reached the defined threshold, the workload management system from using the first ordered combination to using the second ordered combination to assign the workload.

9. The method of claim 1, embodied as computer-executable instructions on at least one non-transitory computer-readable medium.

10. A system comprising:
 a memory storing instructions; and
 a processor communicatively coupled to the memory and configured to execute the instructions to:
  obtain resource utilization data representing utilization of network equipment of a communication network;
  obtain utilities data representing information about utilities at network facilities at which the network equipment is deployed; and
  assign, based on the resource utilization data and the utilities data, a workload among the network equipment deployed at the network facilities, wherein assigning the workload among the network equipment deployed at the network facilities comprises
   assigning, based on a first ordered combination of the resource utilization data followed by the utilities data when the utilities data indicates that a utilization of a utility does not satisfy a defined threshold, a first workload among the network equipment deployed at the network facilities, and
   assigning, based on a second ordered combination of the utilities data followed by the resource utilization data when the utilities data indicates that the utilization of the utility satisfies the defined threshold, a second workload among the network equipment deployed at the network facilities.

11. The system of claim 10, wherein:
 the communication network comprises a provider network operated by a network provider;
 the network facilities comprise a network facility located at an edge of the provider network;
 the network equipment comprises a multi-access edge computing (MEC) server deployed at the network facility located at the edge of the provider network; and
 assigning the workload among the network equipment deployed at the network facilities comprises directing a workload task to or from the MEC server based on the resource utilization data and the utilities data.

12. The system of claim 11, wherein:
 the network facilities comprise an additional network facility located farther from the edge of the provider network than the network facility located at the edge of the provider network;
 the network equipment comprises a multi-access cloud server deployed at the additional network facility; and
 directing the workload task to or from the MEC server based on the resource utilization data and the utilities data comprises moving the workload task from the MEC server deployed at the network facility to the multi-access cloud server deployed at the additional network facility.

13. The system of claim 11, wherein:
 the network facilities comprise an additional network facility located at the edge of the provider network;
 the network equipment comprises an additional MEC server deployed at the additional network facility; and
 directing the workload task to or from the MEC server based on the resource utilization data and the utilities data comprises moving the workload task from the MEC server deployed at the network facility to the additional MEC server deployed at the additional network facility.

14. The system of claim 10, wherein the utilities data represents utilization of electrical power at the network facilities.

15. The system of claim 10 wherein the utilities data represents utilization of cooling capacities at the network facilities.

16. The system of claim 10, wherein:
 the resource utilization data represents latencies associated with the network equipment;
 the utilities data represents utilization of electrical power at the network facilities; and
 assigning the workload among the network equipment based on the resource utilization data and the utilities data comprises directing a workload task to particular network equipment deployed at a particular network facility of the network facilities based on a combination of the latencies associated with the network equipment and the utilization of electrical power at the network facilities.

17. A system comprising:
 a plurality of multi-access servers deployed at a plurality of network facilities of a communication network, the plurality of multi-access servers including a multi-access edge compute (MEC) server at an edge of the communication network and a cloud server farther from the edge of the communication network than the MEC server; and
 a workload management system communicatively coupled to the plurality of multi-access servers, the workload management system configured to:
  obtain resource utilization data representing utilization of the plurality of multi-access servers;
  obtain utilities data representing information about utilities at the plurality of network facilities at which the plurality of multi-access servers are deployed; and
  assign, based on the resource utilization data and the utilities data, a workload among the plurality of multi-access servers deployed at the plurality of network facilities, wherein assigning the workload among the plurality of multi-access servers deployed at the network facilities comprises
   assigning, based on a first ordered combination of the resource utilization data followed by the utilities data when the utilities data indicates that a utilization of a utility does not satisfy a defined threshold, a first workload among the plurality of multi-access servers deployed at the network facilities, and
   assigning, based on a second ordered combination of the utilities data followed by the resource utilization data when the utilities data indicates that the utilization of the utility satisfies the defined threshold, a second workload among the plurality of multi-access servers deployed at the network facilities.

18. The system of claim 17, wherein the utilities data represents utilization of physical space at the network facilities.

19. The system of claim 17, wherein the utilities data comprises a heat map of a network facility of the network facilities, the heat map correlating utilization of a utility to locations at the network facility.

20. The system of claim 19, wherein obtaining utilities data comprises:
  obtaining a depth image and a thermal image from imaging sensors located at the network facility; and
  generating the heat map of the network facility based on the depth image and the thermal image.

* * * * *